(12) United States Patent
Leong

(10) Patent No.: US 11,312,483 B2
(45) Date of Patent: Apr. 26, 2022

(54) LANDING GEAR WITH HYDRAULIC FLUID CHANNELS

(71) Applicant: GOODRICH CORPORATION, Charlotte, NC (US)

(72) Inventor: Mark S. Leong, Arlington, TX (US)

(73) Assignee: Goodrich Corporation, Charlotte, NC (US)

( * ) Notice: Subject to any disclaimer, the term of this patent is extended or adjusted under 35 U.S.C. 154(b) by 452 days.

(21) Appl. No.: 16/409,007

(22) Filed: May 10, 2019

(65) Prior Publication Data

US 2020/0354045 A1 Nov. 12, 2020

(51) Int. Cl.
*B64C 25/22* (2006.01)
*B64C 25/00* (2006.01)
*B64C 25/20* (2006.01)
*B64C 25/60* (2006.01)

(52) U.S. Cl.
CPC ............ *B64C 25/22* (2013.01); *B64C 25/001* (2013.01); *B64C 25/20* (2013.01); *B64C 25/60* (2013.01); *B64C 2025/006* (2013.01)

(58) Field of Classification Search
CPC ....... B64C 25/001; B64C 25/20; B64C 25/22; B64C 25/60; B64C 2025/006
See application file for complete search history.

(56) References Cited

U.S. PATENT DOCUMENTS

| 2,659,615 A | * | 11/1953 | McClain | ................. F16L 39/06 285/121.3 |
| 2,792,998 A | | 5/1957 | Dowty | |
| 6,129,310 A | | 10/2000 | Squires | |
| 6,409,121 B1 | | 6/2002 | Lindahl | |
| 7,264,398 B2 | | 9/2007 | Davies | |
| 9,140,302 B2 | | 9/2015 | Kane | |
| 9,958,068 B2 | | 5/2018 | Hinton et al. | |
| 10,890,211 B2 | | 1/2021 | Bennett | |
| 2003/0039420 A1 | | 2/2003 | Davies | |
| 2014/0369634 A1 | | 12/2014 | Kane | |
| 2015/0258610 A1 | | 9/2015 | Villain-Chastre et al. | |
| 2015/0337896 A1 | | 11/2015 | Dayot et al. | |
| 2016/0047412 A1 | | 2/2016 | Stuk et al. | |
| 2016/0199913 A1 | | 7/2016 | Mark | |

(Continued)

FOREIGN PATENT DOCUMENTS

| CN | 109533296 | 3/2019 |
| DE | 102016222411 | 5/2018 |
| EP | 3269524 | 1/2018 |

(Continued)

OTHER PUBLICATIONS

USPTO, Non-Final Office Action dated Mar. 16, 2021 in U.S. Appl. No. 16/408,944.

(Continued)

*Primary Examiner* — Philip J Bonzell
*Assistant Examiner* — Tye William Abell
(74) *Attorney, Agent, or Firm* — Snell & Wilmer L.L.P.

(57) ABSTRACT

A torque link assembly may comprise an upper torque link, a lower torque link, and a torque link pin. The upper torque link may define an upper hydraulic fluid channel. The lower torque link may define a lower hydraulic fluid channel. The torque link pin may fluidly couple the upper hydraulic fluid channel to the lower hydraulic fluid channel.

18 Claims, 7 Drawing Sheets

(56) References Cited

U.S. PATENT DOCUMENTS

2017/0313414 A1   11/2017   Baird
2017/0361923 A1   12/2017   Himmelmann

FOREIGN PATENT DOCUMENTS

EP    3275780      1/2018
GB    2521392      6/2015
WO    2018077884   5/2018

OTHER PUBLICATIONS

European Patent Office, European Search Report dated Jun. 29, 2020 in Application No. 19214720.5.
European Patent Office, European Search Report dated Jul. 6, 2020 in Application No. 19214967.2.

* cited by examiner

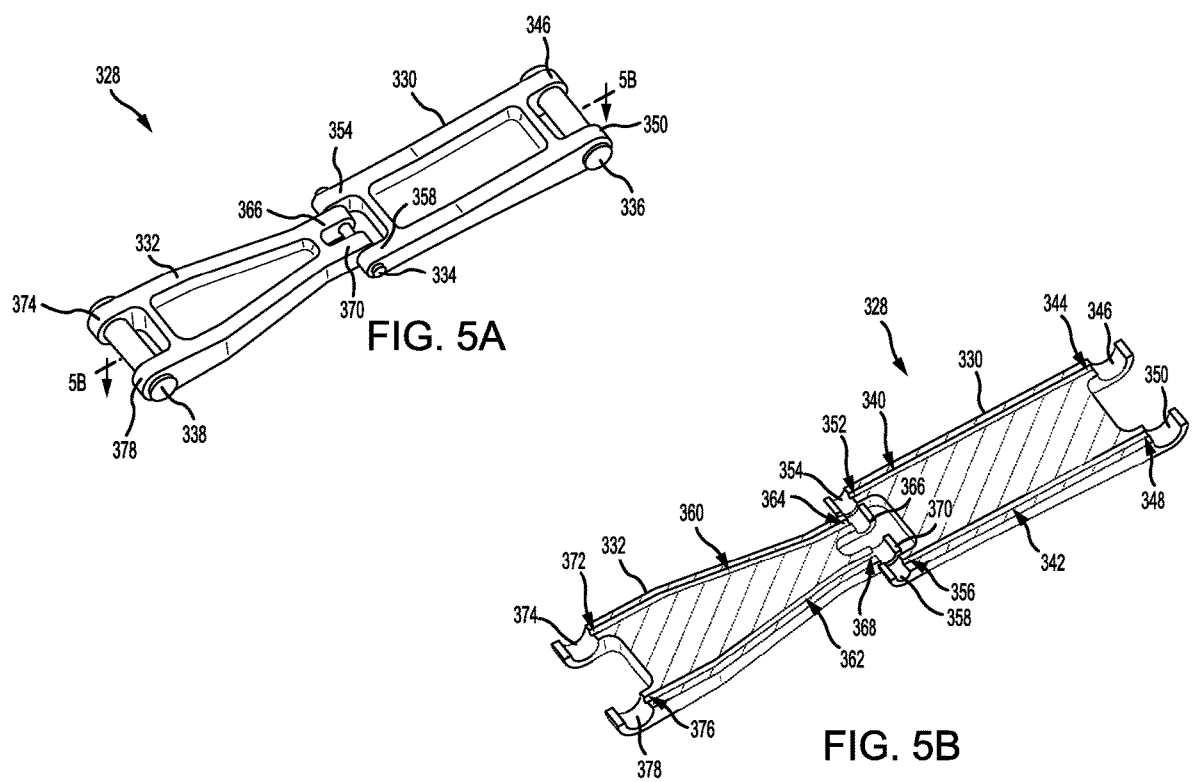

LANDING GEAR WITH HYDRAULIC FLUID CHANNELS

FIELD

The present disclosure relates to landing gear, and more particularly, to additively manufactured landing gear having hydraulic fluid channels formed therethrough.

BACKGROUND

Aircraft typically include a braking system operatively coupled to the wheels of the aircraft and configured to slow the wheels, and the aircraft, during, for example, landing or a rejected takeoff. Brake systems typically employ a series of friction disks located about an axle. The friction disks may be compressed together to stop the aircraft. The compression of the friction disks may be controlled by one or more hydraulic actuator(s). Hydraulic fluid is typically provided to the hydraulic actuators via flexible hosing or tubing that is connected to a hydraulic fluid source located proximate the aircraft fuselage or wing.

The hosing is typically routed along the landing gear shock strut, from the aircraft interface down to the brake, and must accommodate landing gear motion and dynamic effects. When the shock strut strokes (i.e., when the shock strut translates between an extended position and a compressed position), the distance from the axle position to the aircraft interface changes. The length and positioning of the hoses are configured to accommodate this change in distance. Movement of the hoses can cause the hoses to rub on the landing gear hardware, leading to wear spots in the hoses, or bend excessively leading to localized weakening of the hose resulting in an eventual burst. For example, the hoses may contact the tire which can cause chafing of the hoses. Additionally, the hoses are susceptible to contact with a blown tire, or a flailing tire, which can cause hose displacement and/or disconnection from the hydraulic fluid source.

SUMMARY

A torque link assembly is disclosed herein. In accordance with various embodiments, the torque link assembly may comprise an upper torque link, a lower torque link, and a torque link pin. The upper torque link may define a first upper hydraulic fluid channel. The lower torque link may define a first lower hydraulic fluid channel. The torque link pin may fluidly couple the first upper hydraulic fluid channel to the first lower hydraulic fluid channel.

In various embodiments, an upper torque link pin may be located through an upper lug of the upper torque link. The upper torque link pin may define an upper internal pin channel. The upper internal pin channel may be fluidly coupled to the first upper hydraulic fluid channel.

In various embodiments, a lower torque link pin may be located through a lower lug of the lower torque link. The lower torque link pin may define a lower internal pin channel. The lower internal pin channel may be fluidly coupled to the first lower hydraulic fluid channel.

In various embodiments, an outer circumferential surface of the torque link pin may define an upper link groove. The upper link groove may be located at an outlet of the first upper hydraulic fluid channel.

In various embodiments, an outer circumferential surface of the torque link pin may define a lower link groove. The lower link groove may be located at an inlet of the first lower hydraulic fluid channel.

In various embodiments, a second upper hydraulic fluid channel may be defined by the upper torque link, and a second lower hydraulic fluid channel may be defined by the lower torque link.

In various embodiments, the torque link pin may define a first internal pin channel and a second internal pin channel fluidly isolated from the first internal pin channel. The first internal pin channel may be fluidly coupled to the first upper hydraulic fluid channel and the first lower hydraulic fluid channel. The second internal pin channel may be fluidly coupled to the second upper hydraulic fluid channel and the second lower hydraulic fluid channel.

In various embodiments, a lower torque link pin may be located through a lower lug of the lower torque link. The lower torque link pin may define a first lower internal pin channel and a second lower internal pin channel fluidly isolated from the first lower internal pin channel. The first lower internal pin channel may be fluidly coupled to the first lower hydraulic fluid channel. The second lower internal pin channel may be fluidly coupled to the second lower hydraulic fluid channel.

A shock strut assembly is also disclosed herein. In accordance with various embodiments, shock strut assembly may comprise a strut cylinder and a strut piston configured to telescope relative to the strut cylinder. An upper torque link may be coupled to the strut cylinder. The upper torque link may define a first upper hydraulic fluid channel. A lower torque link may be configured to pivot relative to the upper torque link. The lower torque link may define a first lower hydraulic fluid channel. A torque link pin may fluidly couple the first upper hydraulic fluid channel to the first lower hydraulic fluid channel.

In various embodiments, a lower torque link pin may be located through a lower lug of the lower torque link. The lower torque link pin may define a lower internal pin channel. The lower internal pin channel may be fluidly coupled to the first lower hydraulic fluid channel. In various embodiments, a hydraulic fluid conduit may be fluidly coupled to an outlet of the lower torque link pin.

In various embodiments, an upper torque link pin may be located through an upper lug of the upper torque link. The upper torque link pin may define an upper internal pin channel. The upper internal pin channel may be fluidly coupled to the first upper hydraulic fluid channel. In various embodiments, a hydraulic fluid conduit may be fluidly coupled to an inlet of the upper torque link pin.

In various embodiments, an outer circumferential surface of the torque link pin may define an upper link groove and a lower link groove. The upper link groove may be located at an outlet of the first upper hydraulic fluid channel. The lower link groove may be located at an inlet of the first lower hydraulic fluid channel.

In various embodiments, the upper torque link may define a second upper hydraulic fluid channel, and the lower torque link may define a second lower hydraulic fluid channel. In various embodiments, the torque link pin may define a first internal pin channel and a second internal pin channel fluidly isolated from the first internal pin channel. The first internal pin channel may be fluidly coupled to the first upper hydraulic fluid channel and the first lower hydraulic fluid channel. The second internal pin channel may be fluidly coupled to the second upper hydraulic fluid channel and the second lower hydraulic fluid channel.

A landing gear assembly is also disclosed herein. In accordance with various embodiments, the landing gear assembly may comprise an upper torque link, a lower torque link, and a hydraulic piston. The upper torque link may define a first upper hydraulic fluid channel. The lower torque link may define a first lower hydraulic fluid channel. The first lower hydraulic fluid channel may be in fluid communication with the first upper hydraulic fluid channel. The hydraulic piston may be in fluid communication with the first lower hydraulic fluid channel.

In various embodiments, a torque link pin may fluidly couple the first upper hydraulic fluid channel to the first lower hydraulic fluid channel. In various embodiments, the upper torque link may define a second upper hydraulic fluid channel, and the lower torque link may define a second lower hydraulic fluid channel.

In various embodiments, an upper torque link pin may be located through an upper lug of the upper torque link. An upper pin channel defined by the upper torque link pin may be fluidly coupled to the first upper hydraulic fluid channel. A first hydraulic fluid conduit may be fluidly coupled between an upper pin inlet of the upper torque link pin and a hydraulic fluid source. A lower torque link pin may be located through a lower lug of the lower torque link. A lower pin channel defined by the lower torque link pin may be fluidly coupled to the first lower hydraulic fluid channel. A second hydraulic fluid conduit may be fluidly coupled between an outlet of the lower torque link pin and an inlet of the hydraulic piston.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 5A illustrates a perspective view of an additively manufactured landing gear component having hydraulic fluid channels formed therethrough, in accordance with various embodiments;

FIG. 5B illustrates a cross-section view, taken along the line 5B-5B in FIG. 5A, of an additively manufactured landing gear component having hydraulic fluid channels formed therethrough, in accordance with various embodiments.

Figure 1:
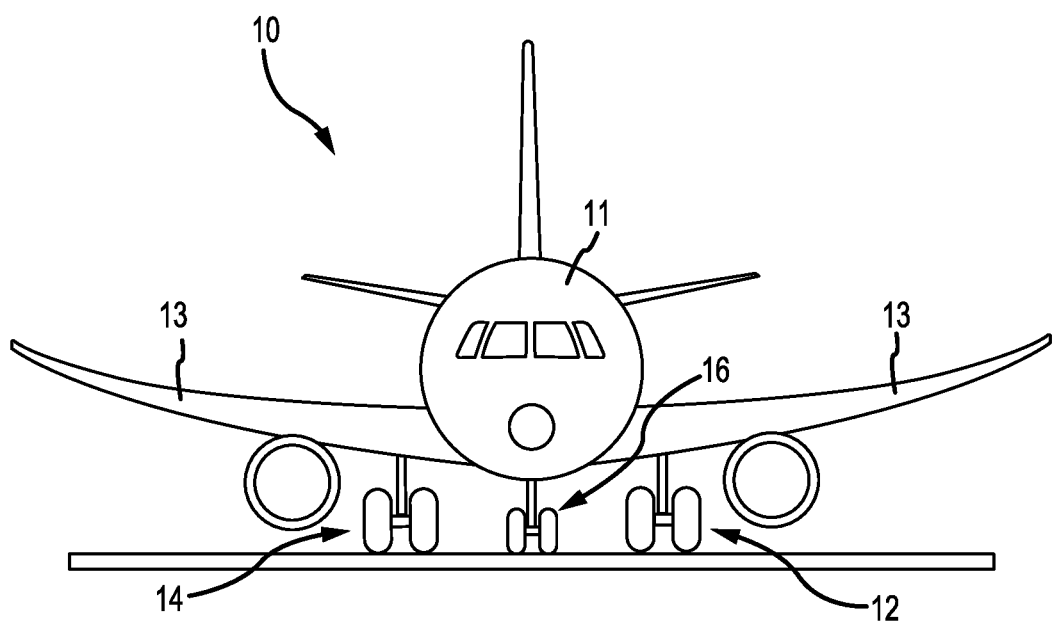
FIG. 1 illustrates an aircraft, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected or the like may include permanent, removable, temporary, partial, full, and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily repeated herein for the sake of clarity.

A first component that is "radially outward" of a second component means that the first component is positioned at a greater distance away from a common axis of the first and second components than the second component. A first component that is "radially inward" of a second component means that the first component is positioned closer to a common axis of the first and second components than the second component.

Landing gear components, for example, torque links, of the present disclosure, in accordance with various embodiments, are formed using an additive manufacturing technique. Forming the components using additive manufacturing allows hydraulic fluid channels to be formed through the component at the time of component formation. The hydraulic fluid channels may reduce the amount and/or length of hosing around the landing gear component and/or aircraft tires. Simultaneously forming the component and the hydraulic fluid channels, as opposed to drilling the hydraulic fluid channels after forming the component, may reduce manufacturing time and costs as the potential for drilling error is eliminated. Additionally, additively manufacturing the hydraulic fluid channels allows for channel designs and geometries that could not be produced through conventional manufacturing. For example, in various embodiments, additive manufacturing techniques may be employed to form hydraulic fluid channels having curved or angled flow paths. In this regard, the hydraulic fluid channels may be designed to avoid high stress zones in the landing gear component and eliminate the need to use plugs that result in undesirable sustained and/or residual stresses.

As used herein, the term "additive manufacturing" encompasses any method or process whereby a three-dimensional object is produced by creation of a substrate or material, such as by addition of successive layers of a material to an object to produce a manufactured product that has an increased mass or bulk at the end of the additive manufacturing process as compared to the beginning of the process. In contrast, traditional (i.e., non-additive) manufacturing by machining or tooling typically relies on material removal or subtractive processes, such as cutting, machining, extruding, turning, drilling, grinding, stamping, and/or the like, to produce a final manufactured object that has a decreased mass or bulk relative to the starting workpiece. Other traditional, non-additive manufacturing methods include forging or casting, such as investment casting, which utilizes the steps of creating a form, making a mold of the form, and casting or forging a material (such as metal) using the mold. As used herein, the term "additive manufacturing" should not be construed to encompass a joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

With reference to FIG. 1, an aircraft 10 is illustrated, in accordance with various embodiments. Aircraft 10 includes a fuselage 11 and wings 13. Aircraft 10 includes landing gear such as left landing gear assembly 12, right landing gear assembly 14, and nose landing gear assembly 16 (referred to herein collectively as landing gear assemblies 12, 14, 16). Landing gear assemblies 12, 14, 16 may generally support aircraft 10, when aircraft 10 is not flying, allowing aircraft 10 to taxi, take-off, and land without damage. Landing gear assemblies 12, 14, 16 may each be configured to translate between a landing gear down position, wherein the landing gear assemblies extend from wings 13 and/or fuselage 11 to support aircraft 10, and a landing gear up position, wherein the landing gear assemblies are located within wings 13 and/or fuselage 11 of aircraft 10. For example, during taxiing and take-off, and landing, landing gear assemblies 12, 14, 16 may be in the landing gear down position. After take-off, landing gear assemblies 12, 14, 16 may be translated to the landing gear up position. Prior to landing, landing gear assemblies 12, 14, 16 may be translated to the landing gear down position to support aircraft 10 during landing. Landing gear assemblies 12, 14, 16 may each include various shock strut assemblies configured to control motion of the landing gear, and absorb and damp loads imposed on the landing gear during landing, taxiing, braking, and takeoff.

Figure 2:
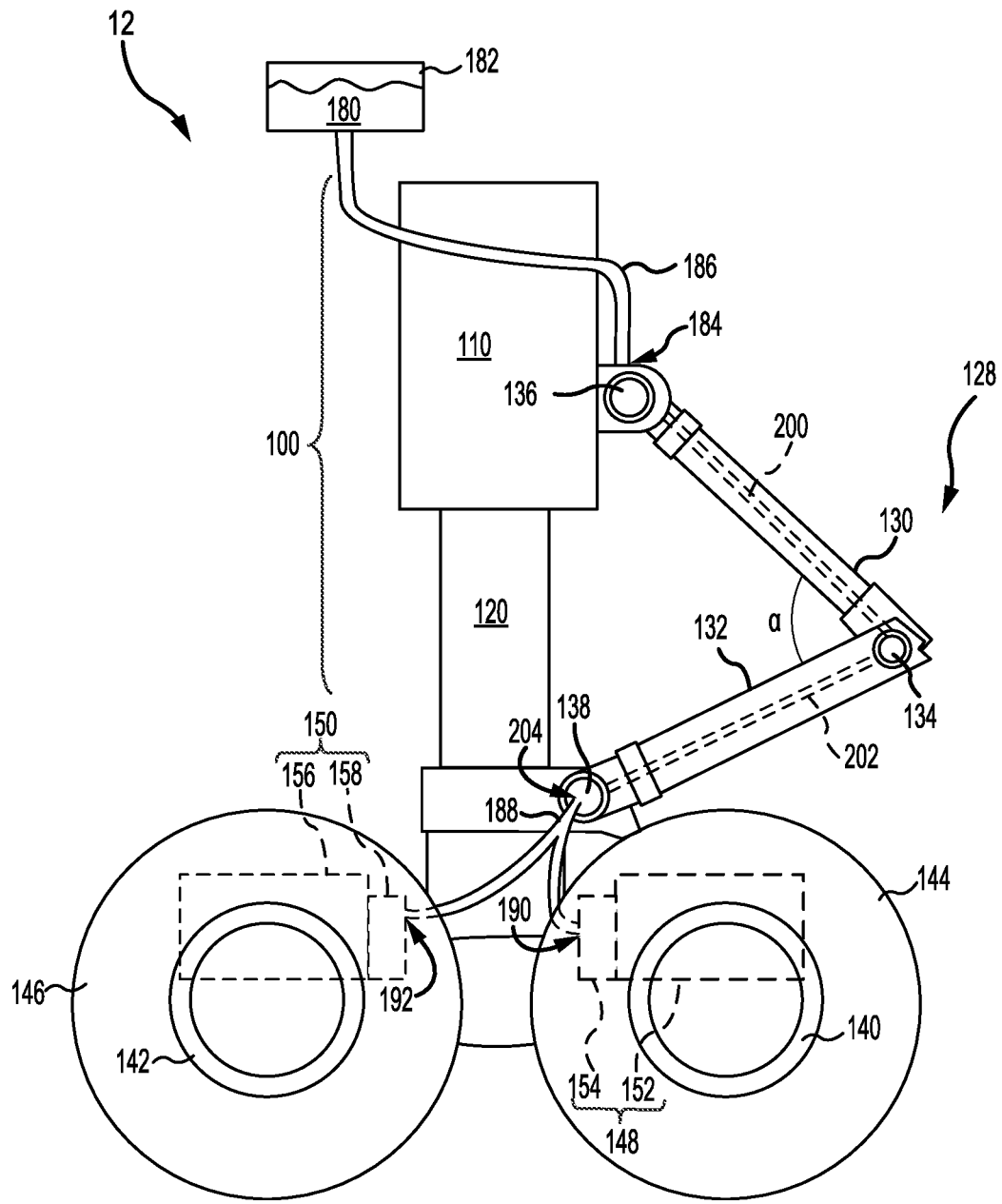
FIG. 2 illustrates a landing gear assembly, in accordance with various embodiments.

Referring to FIG. 2, and with continued reference to FIG. 1, left landing gear assembly 12 is illustrated, in accordance with various embodiments. While FIGS. 2, 3, 4A, and 4B illustrate components of left landing gear assembly 12, it should be understood that right landing gear assembly 14 and/or nose landing gear assembly 16 may include the elements and functionalities as described herein with respect to left landing gear assembly 12.

Left landing gear assembly 12 may include one or more shock absorbing devices, such as for example, shock strut assembly 100. Shock strut assembly 100 may be configured to absorb and damp loads imposed on left landing gear assembly 12 during landing, taxiing, braking, and takeoff. Shock strut assembly 100 include a strut cylinder 110 and a strut piston 120 configured to telescope relative to strut cylinder 110. Strut piston 120 may be operatively coupled to strut cylinder 110. Strut cylinder 110 may be configured to receive strut piston 120 in a manner that allows the strut piston 120 to telescope with respect to strut cylinder 110. In this regard, strut piston 120 may translate in and out strut cylinder 110.

Shock strut assembly 100 includes a torque link assembly 128. In various embodiments, torque link assembly 128 may include an upper (or first) torque link 130 and a lower (or second) torque link 132. Upper torque link 130 may be pivotally coupled to lower torque link 132 via a torque link pin 134. As strut piston 120 translates (i.e., telescopes) relative to strut cylinder 110, upper torque link 130 and lower torque link 132 may rotate about torque link pin 134 and relative to one another. For example, as shock strut assembly 100 compresses (i.e., as strut piston 120 translates into strut cylinder 110), an angle alpha (a) formed by upper torque link 130 and lower torque link 132 decreases. As shock strut assembly 100 extends or decompresses (i.e., as strut piston 120 translates out strut cylinder 110), angle alpha (a) formed by upper torque link 130 and lower torque link 132 increases.

Upper torque link 130 may be pivotally coupled to strut cylinder 110 via an upper torque link pin 136. Lower torque link 132 may be pivotally coupled to strut piston 120 via a lower torque link pin 138. As strut piston 120 translates (i.e., telescopes) relative to strut cylinder 110, upper torque link 130 may rotate about upper torque link pin 136, and lower torque link 132 may rotate about lower torque link pin 138.

Left landing gear assembly 12 further includes one or more wheel(s), such as first wheel 140 and second wheel 142. A first tire 144 may be located around first wheel 140. A second tire 146 may be located around second wheel 142. A first brake system 148 is operationally coupled to first wheel 140. A second brake system 150 is operationally coupled to second wheel 142. First brake system 148 may include a first brake stack 152 and a first piston assembly 154. First piston assembly 154 is configured to apply a force to first brake stack 152. Second brake system 150 may include a second brake stack 156 and a second piston assembly 158. Second piston assembly 158 is configured to apply a force to second brake stack 156. In various embodiments, a first hydraulic system (e.g., hydraulic fluid provided via a first set of hydraulic fluid conduits and channels) controls half of the pistons in first piston assembly 154 and half of the pistons in second piston assembly 158, while a second hydraulic system (e.g., hydraulic fluid provided via a second set of hydraulic fluid conduits and channels) controls the other half of the pistons in first piston assembly 154 and the other half of the pistons in second piston assembly 158. Having two hydraulic systems operationally coupled to both first and second piston assemblies 154, 158 may allow for first and second brake systems 148, 150 to be powered equally (symmetrical) should either hydraulic system fail.

Figure 3:
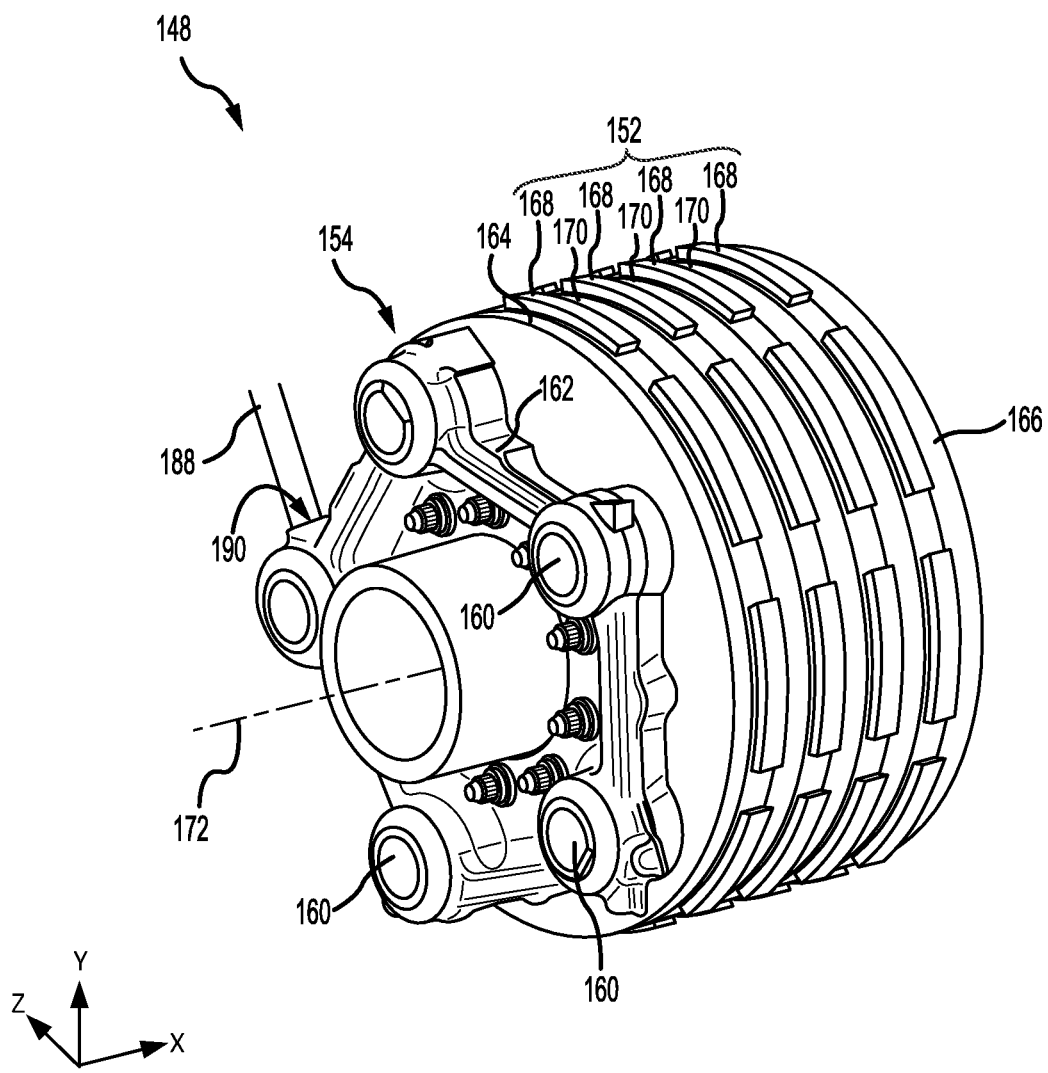
FIG. 3 illustrates a brake assembly, in accordance with various embodiments.

With reference to FIG. 3, first brake system 148 is illustrated, in accordance with various embodiments. While FIG. 3 illustrates components of first brake system 148, it is understood that second brake system 150 and/or the brake systems of right landing gear assembly 14 and/or nose landing gear assembly 16 may include the elements and functionalities as described herein with respect to first brake system 148.

In accordance with various embodiments, first brake system 148 includes first brake stack 152 and first piston assembly 154. First piston assembly 154 includes one or more pistons 160 and a piston housing (or piston manifold)

162. Pistons 160 may be mounted and/or housed within piston housing 162. First brake system 148 includes a pressure plate 164, an end plate 166, a plurality of rotating discs, or rotors, 168, and a plurality of non-rotating disks, or stators, 170 (collectively referred to herein as first brake stack 152). Rotors 168 and stators 170 are positioned in an alternating fashion between end plate 166 and pressure plate 164. Rotors 168 may rotate about an axis 172 and stators 170 may have little to no angular movement relative to axis 172. A wheel (such as first wheel 140 with brief reference to FIG. 2) may be coupled to rotors 168. In accordance with various embodiments, pistons 160 are configured to apply a force to pressure plate 164 in a direction towards end plate 166. As force is applied to pressure plate 164, rotors 168 and stators 170 are forced together in an axial direction between pressure plate 164 and end plate 166, thereby causing the rotational speed of rotors 168 to decrease (i.e., causing a braking effect) due to friction between rotors 168 and stators 170.

In accordance with various embodiments, pistons 160 may be hydraulic pistons, also referred to as hydraulic actuators. In this regard, changes in the hydraulic pressure within pistons 160 may cause actuation of pistons 160. For example, an increase in hydraulic pressure results in an actuation of pistons 160 towards pressure plate 164, thereby increasing the force exerted on pressure plate 164. A decrease in hydraulic pressure results in an actuation of pistons 160 away from pressure plate 164, thereby decreasing the force exerted on pressure plate 164. In accordance with various embodiments, the hydraulic pressure within pistons 160 may be controlled via a flow of hydraulic fluid to and from pistons 160.

With combined reference to FIG. 2 and FIG. 3, a hydraulic fluid source 182 may provide a hydraulic fluid 180 to first and second brake systems 148, 150. In various embodiments, hydraulic fluid source 182 may be located in the fuselage 11 and/or in wings 13 of aircraft 10, with momentary reference to FIG. 1. Hydraulic fluid source 182 may be fluidly coupled to (i.e., is in fluid communication with) an upper pin inlet 184 of upper torque link pin 136 via a hydraulic fluid conduit 186. As described in further detail below, hydraulic fluid 180 may be provided to first and second piston assemblies 154, 158 via a series of fluidly connected upper and lower hydraulic fluid channels 200, 202 formed, respectively, through upper torque link 130 and lower torque link 132. Upper and lower hydraulic fluid channels 200, 202 may be fluidly connected to a hydraulic fluid conduit, or hose, 188 via, for example, lower torque link pin 138. Hydraulic fluid conduit 188 may be fluidly coupled between inlet 190 of piston housing 162 and a lower pin outlet 204 of lower torque link pin 138. In various embodiments, piston housing 162 may include piping (i.e., a one more hydraulic fluid conduits) fluidly coupling each of the pistons 160 to inlet 190, such that a single hydraulic fluid conduit 188 may provide hydraulic fluid 180 to each of the pistons 160. In various embodiments, piston housing 162 may include multiple hydraulic fluid inlets each having a hydraulic fluid conduit, similar to hydraulic fluid conduit 188, fluidly coupled thereto. In various embodiments, hydraulic fluid conduit 188 is also fluidly coupled an inlet 192 of second piston assembly 158.

Figure 4A:
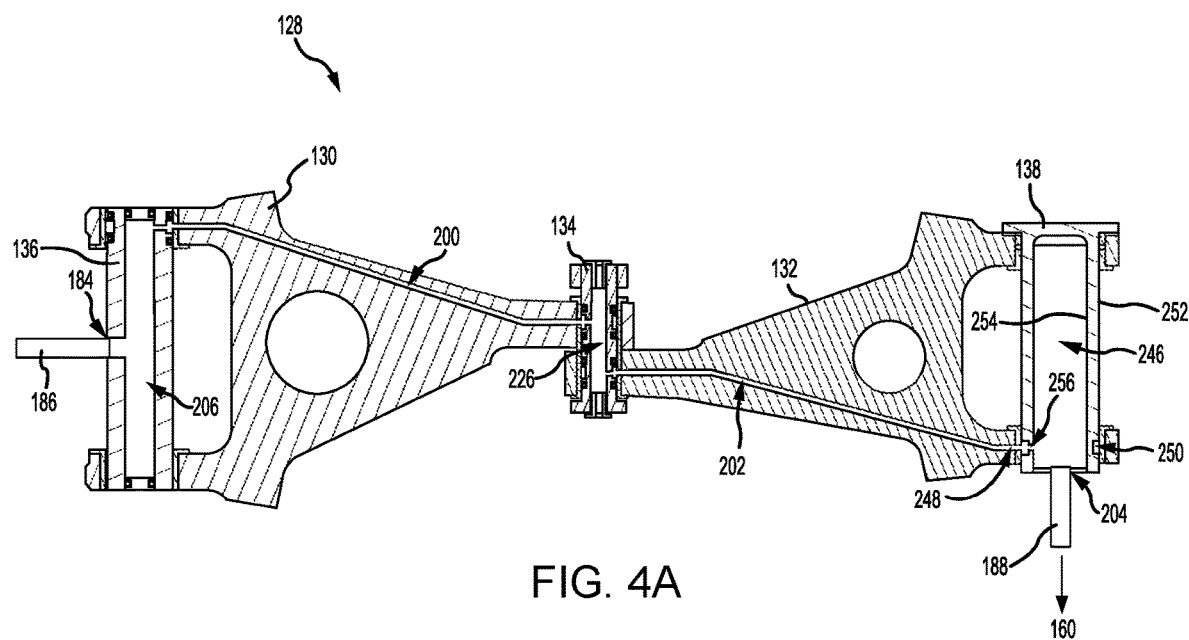
FIGS. 4A and 4B illustrate a cross-section view of an additively manufactured landing gear component having hydraulic fluid channels formed therethrough, in accordance with various embodiments.

With reference to FIG. 4A, a cross-section view of torque link assembly 128 is illustrated, in accordance with various embodiments. In various embodiments, upper torque link 130 may define an upper (or first) hydraulic fluid channel 200, and lower torque link 132 may define a lower (or second) hydraulic fluid channel 202, which is in fluid communication with upper hydraulic fluid channel 200. In accordance with various embodiments, upper and lower torque links 130, 132 may each be formed using additive manufacturing. For example, upper and lower torque links 130, 132 may be formed using wire arc additive manufacturing, electron beam additive manufacturing, or any other suitable additive manufacturing technique. Forming upper and lower torque links 130, 132 using additive manufacturing allows the flow paths defined by upper and lower hydraulic fluid channels 200, 202 to be formed in any desired location and having any desired geometry. For example, upper and lower hydraulic fluid channels 200, 202 may be curved and/or angled and/or include bends of a varying cross section shape and size along the fluid passageway. In this regard, hydraulic fluid 180, with momentary reference to FIG. 2, may flow axially, radially, and/or circumferentially through upper and lower torque links 130, 132.

In various embodiments, upper hydraulic fluid channel 200 may be fluidly coupled to upper torque link pin 136 and torque link pin 134. Lower hydraulic fluid channel 202 may be fluidly coupled to torque link pin 134 and lower torque link pin 138. Hydraulic fluid conduit 186 may be fluidly coupled to upper pin inlet 184 of upper torque link pin 136. Hydraulic fluid conduit 188 may be fluidly coupled to a lower pin outlet 204 of lower torque link pin 138.

Figure 4B:
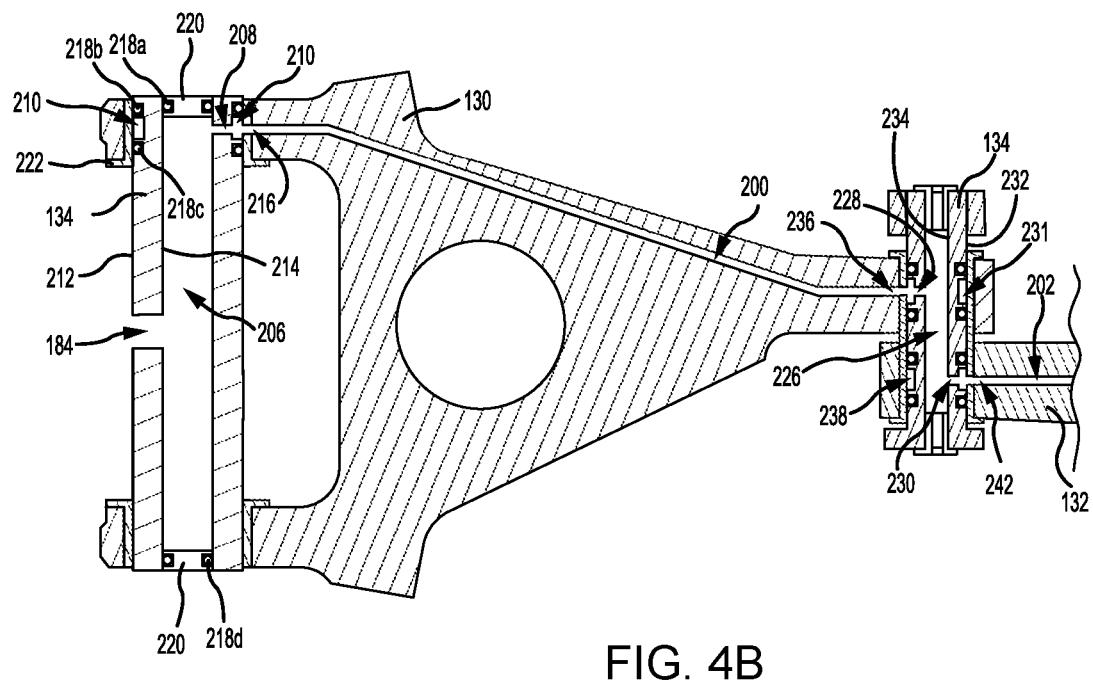

With reference to FIG. 4B, in various embodiments, upper torque link pin 136 defines an upper internal pin channel 206. Stated differently, upper internal pin channel 206 may be formed through, at least, a portion of upper torque link pin 136. Upper internal pin channel 206 provides a fluid connection between upper pin inlet 184 and an upper pin outlet 208 of upper torque link pin 136. In FIG. 4B, hydraulic fluid conduit 186 has been removed for clarity. In various embodiments, a spool may be inserted into an inner diameter of upper torque link pin 136 to distribute the hydraulic fluid. The spool may include fittings to connect to the hydraulic fluid source (e.g., hydraulic fluid conduit 186) and to the hydraulic fluid channel (e.g., to an inlet 216 of upper hydraulic fluid channel 200).

In various embodiments, an outlet groove 210 may be formed in an outer circumferential surface 212 of upper torque link pin 136. Outer circumferential surface 212 is generally opposite, or oriented away from, an internal surface 214 of upper torque link pin 136. Internal surface 214 of upper torque link pin 136 defines upper internal pin channel 206. Outlet groove 210 is formed at a location corresponding to upper pin outlet 208 and inlet 216 of upper hydraulic fluid channel 200. Outlet groove 210 allows hydraulic fluid 180 (FIG. 2) to flow into upper hydraulic fluid channel 200, when inlet 216 of upper hydraulic fluid channel 200 is circumferentially offset from (i.e., not aligned with) upper pin outlet 208 of upper torque link pin 136. For example, as shock strut assembly 100 (FIG. 2) compresses and decompresses, upper torque link 130 rotates about upper torque link pin 136, thereby causing inlet 216 to rotate about outer circumferential surface 212 of upper torque link pin 136. Outlet groove 210 allows upper hydraulic fluid channel 200 to remain fluidly connect to upper internal pin channel 206 regardless of the position of upper torque link 130. In this regard, hydraulic fluid 180 may flow from hydraulic fluid source 182 (FIG. 2) into upper internal pin channel 206, and then through upper pin outlet 208 and into outlet groove 210, and from outlet groove 210 into upper hydraulic fluid channel 200.

In various embodiments, one or more O-ring seals, such as O-ring seals 218a, 218b, 218c, and 218d, may form a sealing interface with upper torque link pin 136 and one or more adjacent structures. For example, O-ring seals 218a and 218d may be located between upper torque link pin 136 and one or more caps 220 located on opposing ends of upper internal pin channel 206. O-ring seals 218b and 218c may be located between upper torque link pin 136 and one or more bushings 222 located around outer circumferential surface 212. The number and location of O-ring seals 218 may be selected to prevent or reduce hydraulic fluid leakage.

In various embodiments, torque link pin 134 defines an internal pin channel 226. Stated differently, internal pin channel 226 may be formed through, at least, a portion of torque link pin 134. Internal pin channel 226 provides a fluid connection between an inlet 228 and an outlet 230 of torque link pin 134. In various embodiments, a spool may be inserted into an inner diameter of torque link pin 134 to distribute the hydraulic fluid. The spool may include fittings to connect to an outlet 236 of upper hydraulic fluid channel 200 and to an inlet 242 of lower hydraulic fluid channel 202.

In various embodiments, an upper link (or first) groove 231 may be formed in an outer circumferential surface 232 of torque link pin 134. Outer circumferential surface 232 is generally opposite, or oriented away from, an internal surface 234 of torque link pin 134. Internal surface 234 of torque link pin 134 defines internal pin channel 226. Upper link groove 231 is formed at a location corresponding to outlet 236 of upper hydraulic fluid channel 200 and inlet 228 of torque link pin 134. Upper link groove 231 allows hydraulic fluid 180 (FIG. 2) to flow into internal pin channel 226 from upper hydraulic fluid channel 200, when outlet 236 of upper hydraulic fluid channel 200 is circumferentially offset from (i.e. not aligned with) inlet 228 of torque link pin 134. For example, as shock strut assembly 100 (FIG. 2) compresses and decompresses, upper torque link 130 rotates about torque link pin 134, thereby causing outlet 236 of upper hydraulic fluid channel 200 to rotate about outer circumferential surface 232 of torque link pin 134. Upper link groove 231 allows upper hydraulic fluid channel 200 to remain fluidly connected to inlet 228 of internal pin channel 226 regardless of the position of outlet 236 of upper torque link 130. In this regard, hydraulic fluid 180 may flow from upper hydraulic fluid channel 200, into upper link groove 231, and then into internal pin channel 226.

In various embodiments, a lower link (or second) groove 238 may be formed in outer circumferential surface 232 of torque link pin 134. Lower link groove 238 is formed at a location corresponding to outlet 230 of torque link pin 134 and inlet 242 of lower hydraulic fluid channel 202. Lower link groove 238 allows hydraulic fluid 180 (FIG. 2) to flow into lower hydraulic fluid channel 202 from internal pin channel 226, when inlet 242 of lower hydraulic fluid channel 202 is circumferentially offset from (i.e. not aligned with) outlet 230 of torque link pin 134. For example, as shock strut assembly 100 (FIG. 2) compresses and decompresses, lower torque link 132 rotates about torque link pin 134, thereby causing inlet 242 of lower hydraulic fluid channel 202 to rotate about outer circumferential surface 232 of torque link pin 134. Lower link groove 238 allows lower hydraulic fluid channel 202 to remain fluidly connected to outlet 230 of internal pin channel 226 regardless of the position of inlet 242 of lower torque link 132. In this regard, hydraulic fluid 180 may flow from internal pin channel 226, into lower link groove 238, and then into lower hydraulic fluid channel 202.

In various embodiments, one or more O-ring seals may form a sealing interface with torque link pin 134 and one or more adjacent structures. For example, the O-ring seals may be located between torque link pin 134 and one or more bushings located around outer circumferential surface 232. The number and location of O-ring seals may be selected to prevent or reduce hydraulic fluid leakage.

Returning to FIG. 4A, in various embodiments, lower torque link pin 138 defines a lower internal pin channel 246. Stated differently, lower internal pin channel 246 may be formed through, at least, a portion of lower torque link pin 138. Lower internal pin channel 246 provides a fluid connection between an outlet 248 of lower hydraulic fluid channel 202 and a lower pin outlet 204 of lower torque link pin 138. In various embodiments, a spool may be inserted into an inner diameter of lower torque link pin 138 to distribute the hydraulic fluid. The spool may include fittings to connect to outlet 248 of lower hydraulic fluid channel 202 and to hydraulic fluid conduit 188.

In various embodiments, an inlet groove 250 may be formed in an outer circumferential surface 252 of lower torque link pin 138. Outer circumferential surface 252 is generally opposite, or oriented away from, an internal surface 254 of lower torque link pin 138. Internal surface 254 of lower torque link pin 138 defines lower internal pin channel 246. Inlet groove 250 is formed at a location corresponding to outlet 248 lower hydraulic fluid channel 202 and a lower pin inlet 256 of lower torque link pin 138. Inlet groove 250 allows hydraulic fluid 180 (FIG. 2) to flow into lower internal pin channel 246, when outlet 248 of lower hydraulic fluid channel 202 is circumferentially offset from (i.e., not aligned with) lower pin inlet 256 of lower torque link pin 138. For example, as shock strut assembly 100 (FIG. 2) compresses and decompresses, lower torque link 132 rotates about lower torque link pin 138, thereby causing outlet 248 to rotate about outer circumferential surface 252 of lower torque link pin 138. Inlet groove 250 allows lower hydraulic fluid channel 202 to remain fluidly connect to lower pin inlet 256 of lower internal pin channel 246 regardless of the position of lower torque link 132. In this regard, hydraulic fluid 180 may flow from lower hydraulic fluid channel 202 into inlet groove 250, and then into lower internal pin channel 246. Hydraulic fluid 180 may flow from lower internal pin channel 246 to pistons 160 via hydraulic fluid conduit 188.

In various embodiments, one or more O-ring seals may form a sealing interface with lower torque link pin 138 and one or more adjacent structures. For example, the O-ring seals may be located between lower torque link pin 138 and one or more bushings located around outer circumferential surface 252. The number and location of O-ring seals may be selected to prevent or reduce hydraulic fluid leakage.

Additively manufacturing torque link assembly 128 including upper and lower hydraulic fluid channels 200, 202 may allow for an elimination or a reduction in the number and/or length of landing gear hydraulic hoses. Less hosing tends to reduce the number of parts associated with routing and retaining hoses, which tends to reduce an overall weight and cost of the landing gear assembly. Eliminating or reducing the length of the hydraulic hoses may decrease occurrences of contact between the hydraulic hoses and adjacent components such as tires, thereby reducing a likelihood of a burst hydraulic hose. Additively manufacturing upper and lower torque links 130, 132 allows the upper and lower hydraulic fluid channels 200, 202 to be formed simultaneously with upper and lower torque links 130, 132, thereby eliminating a need to drill the hydraulic fluid channels through the torque links and/or make the hydraulic fluid channels from castings. Additively manufactured hydraulic fluid channels tends to be advantageous over drilled passageways as additively manufactured hydraulic fluid channels may not be associated with plugs, which can result in sustained and/or residual stresses in the parent part (e.g., in upper and lower torque links 130, 132).

Referring now to FIGS. 5A and 5B, a torque link assembly 328 is illustrated, in accordance with various embodiments. In various embodiments, shock strut assembly 100, with momentary reference to FIG. 2, may include torque link assembly 328 in place of torque link assembly 128.

Torque link assembly 328 includes an upper (or first) torque link 330 and a lower (or second) torque link 332. Upper torque link 330 may be pivotally coupled to lower torque link 332 via a torque link pin 334. Stated differently, upper torque link 330 and lower torque link 332 may rotate about torque link pin 334. Upper torque link 330 may be pivotally coupled to a strut cylinder or other landing gear component via an upper torque link pin 336. Stated differently, upper torque link 330 may rotate about upper torque link pin 336. Lower torque link 332 may be pivotally coupled to a strut piston or other landing gear component via lower torque link pin 338. Stated differently, lower torque link 332 may rotate about lower torque link pin 338.

In various embodiment, upper torque link 330 may define a first upper hydraulic fluid channel 340 and a second, or alternate, upper hydraulic fluid channel 342 facilitated by the additive manufacturing process. In various embodiments, an inlet 344 of first upper hydraulic fluid channel 340 may be located proximate a first upper lug 346 of upper torque link 330. An inlet 348 of second upper hydraulic fluid channel 342 may be located proximate a second upper lug 350 of upper torque link 330. First and second upper lugs 346, 350 may be configured to receive upper torque link pin 336. An outlet 352 of first upper hydraulic fluid channel 340 may be located proximate a first lower lug 354 of upper torque link 330. An outlet 356 of second upper hydraulic fluid channel 342 may be located proximate a second lower lug 358 of upper torque link 330. First and second lower lugs 354, 358 may be configured to receive torque link pin 334.

In various embodiment, lower torque link 332 may define a first lower hydraulic fluid channel 360 and a second, or alternate, lower hydraulic fluid channel 362 facilitated by the additive manufacturing process. In various embodiments, an inlet 364 of first lower hydraulic fluid channel 360 may be located proximate a first upper lug 366 of lower torque link 332. An inlet 368 of second lower hydraulic fluid channel 362 may be located proximate a second upper lug 370 of lower torque link 332. First and second upper lugs 366, 370 may be configured to receive torque link pin 334. An outlet 372 of first lower hydraulic fluid channel 360 may be located proximate a first lower lug 374 of lower torque link 332. An outlet 376 of second lower hydraulic fluid channel 362 may be located proximate a second lower lug 378 of lower torque link 332. First and second lower lugs 374, 378 may be configured to receive lower torque link pin 338.

In accordance with various embodiments, upper and lower torque links 330, 332 may each be formed using additive manufacturing. For example, upper and lower torque links 330, 332 may be formed using wire arc additive manufacturing, electron beam additive manufacturing, or any other suitable additive manufacturing technique. Forming upper and lower torque links 330, 332 using additive manufacturing allows the flow paths defined by first and second upper hydraulic fluid channels 340, 342 and the flow paths defined by first and second lower hydraulic fluid channels 360, 362 to be formed in any desired location and having any desired geometry. For example, hydraulic fluid channels 340, 342, 360, 362 may be curved and/or angled and/or include bends of a varying cross section shape and size along the fluid passageway. In this regard, hydraulic fluid may flow axially, radially, and/or circumferentially through upper and lower torque links 330, 332.

In various embodiments, first and second upper hydraulic fluid channels 340, 342 may each be fluidly coupled to upper torque link pin 336 and torque link pin 334. First and second lower hydraulic fluid channels 360, 362 may be fluidly coupled to torque link pin 334 and lower torque link pin 338.

Figure 6A:
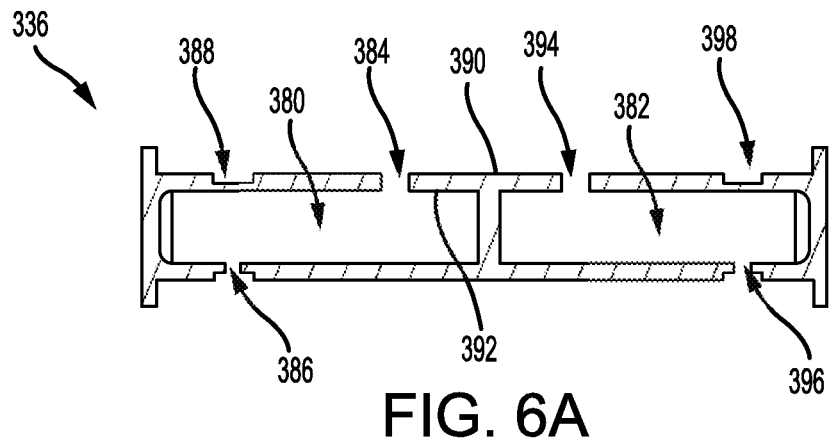
FIGS. 6A, 6B, and 6C illustrate cross-section views of torque link pins configured to fluidly couple to hydraulic fluid channels formed through additively manufactured landing gear components, in accordance with various embodiments.

Referring to FIG. 6A, and with continued reference to FIG. 5B, a cross-section view of upper torque link pin 336 is illustrated, in accordance with various embodiments. In various embodiments, upper torque link pin 336 defines a first upper internal pin channel 380 and a second upper internal pin channel 382. In various embodiments, first upper internal pin channel 380 is fluidly isolated (i.e., not fluidly connected) from second upper internal pin channel 382. First upper internal pin channel 380 provides a fluid connection between a first upper pin inlet 384 of upper torque link pin 336 and a first upper pin outlet 386 of upper torque link pin 336. In various embodiments, a first hydraulic fluid conduit, similar to hydraulic fluid conduit 186 in FIG. 2) may be fluidly coupled to first upper pin inlet 384 of upper torque link pin 336 and a hydraulic fluid source.

In various embodiments, a first outlet groove 388 may be formed in an outer circumferential surface 390 of upper torque link pin 336. Outer circumferential surface 390 is generally opposite, or oriented away from, an internal surface 392 of upper torque link pin 336. Internal surface 392 of upper torque link pin 336 defines first and second upper internal pin channels 380, 382. First outlet groove 388 is formed at a location corresponding to first upper pin outlet 386 of upper torque link pin 336 and inlet 344 of first upper hydraulic fluid channel 340. In various embodiments, a groove may be formed in an inner circumferential surface of first upper lug 346 in place of, or in addition to, first outlet groove 388. Stated differently, first upper lug 346 may define a groove having a location that corresponds to first upper pin outlet 386 and inlet 344 of first upper hydraulic fluid channel 340.

Second upper internal pin channel 382 provides a fluid connection between a second upper pin inlet 394 of upper torque link pin 336 and a second upper pin outlet 396 of upper torque link pin 336. In various embodiments, a second hydraulic fluid conduit, similar to hydraulic fluid conduit 186 in FIG. 2) may be fluidly coupled to second upper pin inlet 394 of upper torque link pin 336 and a hydraulic fluid source. In various embodiments, first and second upper internal pin channels 380, 382 may be fluidly connects, such that upper torque link pin 336 has a single inlet, which receives hydraulic fluid from a single hydraulic fluid conduit.

In various embodiments, a second outlet groove 398 may be formed in outer circumferential surface 390 of upper torque link pin 336. Second outlet groove 398 is formed at a location corresponding to second upper pin outlet 396 of upper torque link pin 336 and inlet 348 of second upper hydraulic fluid channel 342. In various embodiments, a groove may be formed in an inner circumferential surface of second upper lug 350 in place of, or in addition to, second outlet groove 398. Stated differently, second upper lug 350 may define a groove having a location that corresponds to second upper pin outlet 396 and inlet 348 of second upper hydraulic fluid channel 342.

Figure 6B:
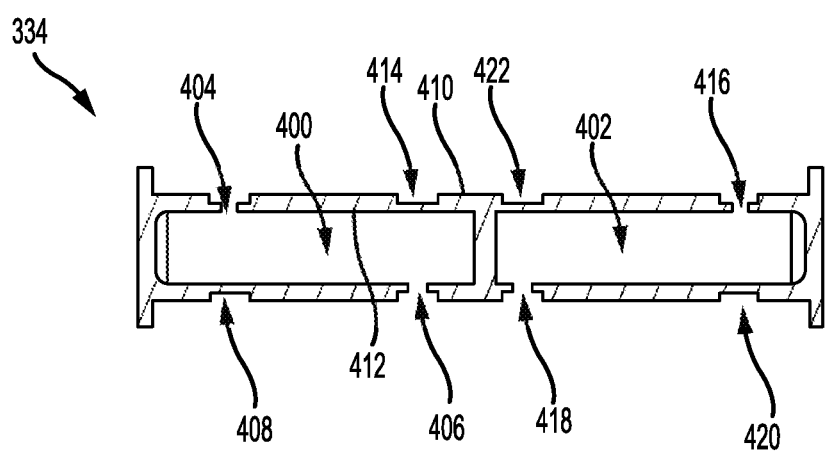

Referring to FIG. 6B, and with continued reference to FIG. 5B, a cross-section view of torque link pin 334 is illustrated, in accordance with various embodiments. In various embodiments, torque link pin 334 defines a first internal pin channel 400 and a second internal pin channel 402. In various embodiments, first internal pin channel 400 is fluidly isolated from second internal pin channel 402. First internal pin channel 400 provides a fluid connection between a first inlet 404 of torque link pin 334 and a first outlet 406 of torque link pin 334. In this regards, first internal pin channel 400 provides a fluid connection between first upper hydraulic fluid channel 340 and first lower hydraulic fluid channel 360.

In various embodiments, a first upper link groove 408 may be formed in an outer circumferential surface 410 of torque link pin 334. An internal surface 412 of torque link pin 334 defines first and second internal pin channels 400, 402. First upper link groove 408 is formed at a location corresponding to outlet 352 of first upper hydraulic fluid channel 340 and first inlet 404 of torque link pin 334. In various embodiments, a groove may be formed in an inner circumferential surface of first lower lug 354 in place of, or in addition to, first upper link groove 408. Stated differently, first lower lug 354 may define a groove having a location that corresponds to outlet 352 of first upper hydraulic fluid channel 340 and first inlet 404 of torque link pin 334.

A first lower link groove 414 may be formed in outer circumferential surface 410 of torque link pin 334. First lower link groove 414 is formed at a location corresponding to first outlet 406 of torque link pin 334 and inlet 364 of first lower hydraulic fluid channel 360. In various embodiments, a groove may be formed in an inner circumferential surface of first upper lug 366 in place of, or in addition to, first lower link groove 414. Stated differently, first upper lug 366 may define a groove having a location that corresponds to first outlet 406 of torque link pin 334 and inlet 364 of first lower hydraulic fluid channel 360.

Second internal pin channel 402 provides a fluid connection between a second inlet 416 of torque link pin 334 and a second outlet 418 of torque link pin 334. In this regards, second internal pin channel 402 provides a fluid connection between second upper hydraulic fluid channel 342 and second lower hydraulic fluid channel 362.

In various embodiments, a second upper link groove 420 may be formed in outer circumferential surface 410 of torque link pin 334. Second upper link groove 420 is formed at a location corresponding to outlet 356 of second upper hydraulic fluid channel 342 and second inlet 416 of torque link pin 334. In various embodiments, a groove may be formed in an inner circumferential surface of second lower lug 358 in place of, or in addition to, second upper link groove 420. Stated differently, second lower lug 358 may define a groove having a location that corresponds to outlet 356 of second upper hydraulic fluid channel 342 and second inlet 416 of torque link pin 334.

A second lower link groove 422 may be formed in outer circumferential surface 410 of torque link pin 334. Second lower link groove 422 is formed at a location corresponding to second outlet 418 of torque link pin 334 and inlet 368 of second lower hydraulic fluid channel 362. In various embodiments, a groove may be formed in an inner circumferential surface of second upper lug 370 in place of, or in addition to, second lower link groove 422. Stated differently, second upper lug 370 may define a groove having a location that corresponds to second outlet 418 of torque link pin 334 and inlet 368 of second lower hydraulic fluid channel 362.

Figure 6C:
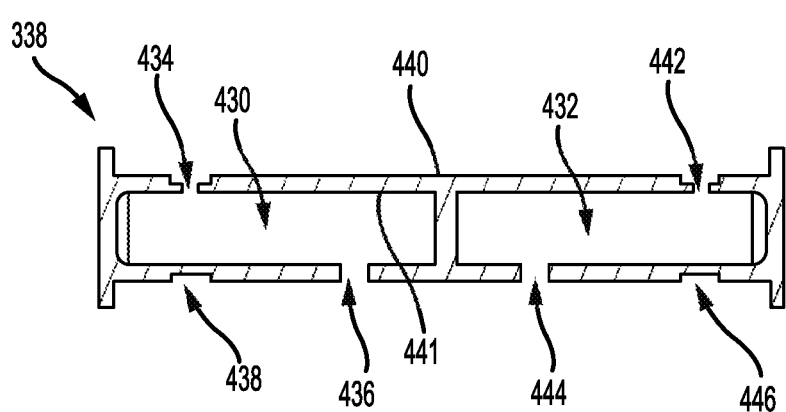

Referring to FIG. 6C, and with continued reference to FIG. 5B, a cross-section view of lower torque link pin 338 is illustrated, in accordance with various embodiments. In various embodiments, lower torque link pin 338 defines a first lower internal pin channel 430 and a second lower internal pin channel 432. In various embodiments, first lower internal pin channel 430 is fluidly isolated from second lower internal pin channel 432. First lower internal pin channel 430 provides a fluid connection between a first lower pin inlet 434 of lower torque link pin 338 and a first lower pin outlet 436 of lower torque link pin 338. In various embodiments, a first hydraulic fluid conduit, similar to hydraulic fluid conduit 188 in FIG. 2, may be fluidly coupled to first lower pin outlet 436 of lower torque link pin 338 and a hydraulic piston assembly, similar to first piston assembly 154 in FIG. 3.

In various embodiments, a first inlet groove 438 may be formed in an outer circumferential surface 440 of lower torque link pin 338. An internal surface 441 of lower torque link pin 338 may define first and second lower internal pin channels 430, 432. First inlet groove 438 is formed at a location corresponding to first lower pin inlet 434 and outlet 372 of first lower hydraulic fluid channel 360. In various embodiments, a groove may be formed in an inner circumferential surface of first lower lug 374 in place of, or in addition to, first inlet groove 438. Stated differently, first lower lug 374 may define a groove having a location that corresponds to first lower pin inlet 434 and outlet 372 of first lower hydraulic fluid channel 360.

Second internal pin channel 432 provides a fluid connection between a second lower pin inlet 442 of lower torque link pin 338 and a second lower pin outlet 444 of lower torque link pin 338. In various embodiments, a second hydraulic fluid conduit, similar to hydraulic fluid conduit 188 in FIG. 2 may be fluidly coupled to second lower pin outlet 444 of lower torque link pin 338 and to a hydraulic piston assembly, similar to first piston assembly 154 in FIG. 3. In various embodiments, a second inlet groove 446 may be formed in outer circumferential surface 440 of lower torque link pin 338. Second inlet groove 446 is formed at a location corresponding to second lower pin inlet 442 and outlet 376 of second lower hydraulic fluid channel 362. In various embodiments, a groove may be formed in an inner circumferential surface of second lower lug 378 in place of, or in addition to, second inlet groove 446. Stated differently, second lower lug 378 may define a groove having a location that corresponds to second lower pin inlet 442 and outlet 376 of second lower hydraulic fluid channel 362.

In various embodiments, first lower internal pin channel 430 may be fluidly connected to a first hydraulic piston assembly (e.g., first piston assembly 154 in FIG. 2) and second lower internal pin channel 432 may be fluidly connected to a second hydraulic piston assembly (e.g., first piston assembly 154 in FIG. 3) different from the first hydraulic piston assembly. In various embodiments, first and second lower internal pin channels 430, 432 may be fluidly connected to the same second hydraulic piston assembly, such that second upper hydraulic fluid channel 342 and second lower hydraulic fluid channel 362 provide a redundant hydraulic fluid flow path. In various embodiments, first and second lower internal pin channels 430, 432 may be fluid connected such that lower torque link pin 338 has a single outlet, which outputs hydraulic fluid to a single hydraulic fluid conduit.

Additively manufacturing torque link assembly 328 including first and second upper hydraulic fluid channels 340, 342 and first and second lower hydraulic fluid channels 360, 362 may allow for an elimination or a reduction in the number and/or length of landing gear hydraulic hoses. Less hosing tends to reduce the number of parts associated with routing and retaining hoses, which tends to reduce an overall weight and cost of the landing gear assembly. Eliminating or reducing the length of the hydraulic hoses may decrease occurrences of contact between the hydraulic hoses and adjacent components such as tires, thereby reducing a likelihood of a burst hydraulic hose. Additively manufacturing upper and lower torque links 330, 332 allows the hydraulic fluid channels 340, 342, 360, 362 to be formed simultaneously with upper and lower torque links 330, 332, thereby eliminating a need to drill the hydraulic fluid channels through the torque links and/or make the hydraulic fluid channels from castings. Additively manufactured hydraulic fluid channels tends to be advantageous over drilled passageways as additively manufactured hydraulic fluid channels may not be associated with plugs, which can result in sustained and/or residual stresses in the parent part.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A torque link assembly, comprising:
   an upper torque link defining a first upper hydraulic fluid channel;
   a lower torque link defining a first lower hydraulic fluid channel; and
   a torque link pin fluidly coupling the first upper hydraulic fluid channel to the first lower hydraulic fluid channel, wherein the torque link pin includes a pin inlet, a pin outlet, and a first internal pin channel, and wherein the first internal pin channel provides a fluid connection between the pin inlet and the pin outlet, the pin inlet being located at the upper torque link, and the pin outlet being located at the lower torque link; and
   wherein an outer circumferential surface of the torque link pin defines an upper link groove, the upper link groove being located at an outlet of the first upper hydraulic fluid channel, and wherein the upper link groove is configured to allow hydraulic fluid to flow from the first upper hydraulic fluid channel into the first internal pin channel when the outlet of the first upper hydraulic fluid channel is circumferentially offset from the pin inlet.

2. The torque link assembly of claim 1, wherein the outer circumferential surface of the torque link pin further defines a lower link groove, and wherein the lower link groove is located at an inlet of the first lower hydraulic fluid channel, and wherein the lower link groove is configured to allow hydraulic fluid to flow from the first internal pin channel into the first lower hydraulic fluid channel into when the inlet of the first lower hydraulic fluid channel is circumferentially offset from the pin outlet.

3. The torque link assembly of claim 1, further comprising an upper torque link pin located through an upper lug of the upper torque link, wherein the upper torque link pin defines an upper internal pin channel, and wherein the upper internal pin channel is fluidly coupled to the first upper hydraulic fluid channel.

4. The torque link assembly of claim 3, further comprising a lower torque link pin located through a lower lug of the lower torque link, wherein the lower torque link pin defines a lower internal pin channel, and wherein the lower internal pin channel is fluidly coupled to the first lower hydraulic fluid channel.

5. The torque link assembly of claim 1, further comprising:
   a second upper hydraulic fluid channel defined by the upper torque link; and
   a second lower hydraulic fluid channel defined by the lower torque link.

6. The torque link assembly of claim 5, wherein the torque link pin further defines a second internal pin channel fluidly isolated from the first internal pin channel, and wherein the first internal pin channel is fluidly coupled to the first upper hydraulic fluid channel and the first lower hydraulic fluid channel, and wherein the second internal pin channel is fluidly coupled to the second upper hydraulic fluid channel and the second lower hydraulic fluid channel.

7. The torque link assembly of claim 5, further comprising a lower torque link pin located through a lower lug of the lower torque link, wherein the lower torque link pin defines a first lower internal pin channel and a second lower internal pin channel fluidly isolated from the first lower internal pin channel, and wherein the first lower internal pin channel is fluidly coupled to the first lower hydraulic fluid channel, and wherein the second lower internal pin channel is fluidly coupled to the second lower hydraulic fluid channel.

8. A shock strut assembly, comprising:
a strut cylinder;
a strut piston configured to telescope relative to the strut cylinder;
an upper torque link coupled to the strut cylinder, wherein the upper torque link defines a first upper hydraulic fluid channel;
a lower torque link configured to pivot relative to the upper torque link, the lower torque link defining a first lower hydraulic fluid channel; and
a torque link pin fluidly coupling the first upper hydraulic fluid channel to the first lower hydraulic fluid channel, wherein the torque link pin includes a pin inlet, a pin outlet, and a first internal pin channel, and wherein the first internal pin channel provides a fluid connection between the pin inlet and the pin outlet, the pin inlet being located at the upper torque link, and the pin outlet being located at the lower torque link; and
wherein an outer circumferential surface of the torque link pin defines an upper link groove, the upper link groove being located at an outlet of the first upper hydraulic fluid channel, and wherein the upper link groove is configured to allow hydraulic fluid to flow from the first upper hydraulic fluid channel into the first internal pin channel when the outlet of the first upper hydraulic fluid channel is circumferentially offset from the pin inlet.

9. The shock strut assembly of claim 8, wherein an outer circumferential surface of the torque link pin further defines a lower link groove, and wherein the lower link groove is located at an inlet of the first lower hydraulic fluid channel.

10. The shock strut assembly of claim 8, further comprising a lower torque link pin located through a lower lug of the lower torque link, wherein the lower torque link pin defines a lower internal pin channel, and wherein the lower internal pin channel is fluidly coupled to the first lower hydraulic fluid channel.

11. The shock strut assembly of claim 10, further comprising a hydraulic fluid conduit fluidly coupled to an outlet of the lower torque link pin.

12. The shock strut assembly of claim 8, further comprising an upper torque link pin located through an upper lug of the upper torque link, wherein the upper torque link pin defines an upper internal pin channel, and wherein the upper internal pin channel is fluidly coupled to the first upper hydraulic fluid channel.

13. The shock strut assembly of claim 12, further comprising a hydraulic fluid conduit fluidly coupled to an inlet of the upper torque link pin.

14. The shock strut assembly of claim 8, wherein the upper torque link defines a second upper hydraulic fluid channel, and wherein the lower torque link defines a second lower hydraulic fluid channel.

15. The shock strut assembly of claim 14, wherein the torque link pin further defines a second internal pin channel fluidly isolated from the first internal pin channel, and wherein the first internal pin channel is fluidly coupled to the first upper hydraulic fluid channel and the first lower hydraulic fluid channel, and wherein the second internal pin channel is fluidly coupled to the second upper hydraulic fluid channel and the second lower hydraulic fluid channel.

16. A landing gear assembly, comprising:
an upper torque link defining a first upper hydraulic fluid channel;
a lower torque link defining a first lower hydraulic fluid channel;
a torque link pin fluidly coupling the first lower hydraulic fluid channel and the first upper hydraulic fluid channel; and
a hydraulic piston in fluid communication with the first lower hydraulic fluid channel,
wherein the torque link pin includes a pin inlet, a pin outlet, and a first internal pin channel, and wherein the first internal pin channel provides a fluid connection between the pin inlet and the pin outlet, the pin inlet being located at the upper torque link, and the pin outlet being located at the lower torque link; and
wherein an outer circumferential surface of the torque link pin defines an upper link groove, the upper link groove being located at an outlet of the first upper hydraulic fluid channel, and wherein the upper link groove is configured to allow hydraulic fluid to flow from the first upper hydraulic fluid channel into the first internal pin channel when the outlet of the first upper hydraulic fluid channel is circumferentially offset from the pin inlet.

17. The landing gear assembly of claim 16, further comprising:
an upper torque link pin located through an upper lug of the upper torque link, wherein an upper pin channel defined by the upper torque link pin is fluidly coupled to the first upper hydraulic fluid channel;
a first hydraulic fluid conduit fluidly coupled between an upper pin inlet of the upper torque link pin and a hydraulic fluid source;
a lower torque link pin located through a lower lug of the lower torque link, wherein a lower pin channel defined by the lower torque link pin is fluidly coupled to the first lower hydraulic fluid channel; and
a second hydraulic fluid conduit fluidly coupled between an outlet of the lower torque link pin and an inlet of the hydraulic piston.

18. The landing gear assembly of claim 16, wherein the upper torque link defines a second upper hydraulic fluid channel, and wherein the lower torque link defines a second lower hydraulic fluid channel.

\* \* \* \* \*